(12) United States Patent
Moratz

(10) Patent No.: US 9,109,629 B2
(45) Date of Patent: Aug. 18, 2015

(54) BEARING CAGE WITH SELF-LUBRICATING GREASE RESERVOIRS

(71) Applicant: Schaeffler Technologies GmbH & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/331,658

(22) Filed: Jul. 15, 2014

(65) Prior Publication Data

US 2015/0030276 A1 Jan. 29, 2015

Related U.S. Application Data

(60) Provisional application No. 61/857,360, filed on Jul. 23, 2013.

(51) Int. Cl.
*F16C 33/66* (2006.01)

(52) U.S. Cl.
CPC ......... *F16C 33/6614* (2013.01); *F16C 33/6629* (2013.01)

(58) Field of Classification Search
CPC .................. F16C 33/6614; F16C 33/6629
See application file for complete search history.

(56) References Cited

U.S. PATENT DOCUMENTS

| | | | | |
|---|---|---|---|---|
| 3,195,965 | A * | 7/1965 | Van Dorn | 384/475 |
| 4,192,560 | A * | 3/1980 | Hartnett | 384/572 |
| 6,402,386 | B1 * | 6/2002 | Daikuhara | 384/470 |
| 8,454,240 | B2 * | 6/2013 | Doyer et al. | 384/470 |
| 2013/0051717 | A1 * | 2/2013 | Duffy et al. | 384/470 |
| 2013/0266250 | A1 | 10/2013 | Brown | |

* cited by examiner

Primary Examiner — Thomas R. Hannon
(74) Attorney, Agent, or Firm — Simpson & Simpson, PLLC

(57) ABSTRACT

A bearing cage, including an outer circumferential surface, an inner circumferential surface, a radial surface aligned in a direction orthogonal to the axis of rotation, at least one chamber located in material forming the bearing cage and one of at least one first channel connecting the at least one chamber to the radial surface and at least one second channel connecting the at least one chamber to one of the inner circumferential surface or the outer circumferential surface, or at least one first channel connecting the at least one chamber to the inner circumferential surface and at least one second channel connecting the at least one chamber to the outer circumferential surface.

16 Claims, 12 Drawing Sheets

BEARING CAGE WITH SELF-LUBRICATING GREASE RESERVOIRS

CROSS-REFERENCE TO RELATED APPLICATIONS

This application claims the benefit under 35 U.S.C. §119 (e) of U.S. Provisional Application No. 61/857,360, filed Jul. 23, 2013, which application is incorporated herein by reference in its entirety.

TECHNICAL FIELD

The present disclosure relates to a bearing cage with self-lubricating grease reservoirs, in particular, reservoirs formed by chambers in the bearing cage with respective opening to receive lubricant into the chambers and to dispense the lubricant to inner or outer circumferential surfaces of the bearing. The present disclosure relates to a bearing assembly including a bearing cage with self-lubricating grease reservoirs.

BACKGROUND

It is known to use spindle bearing for high-speed applications such as machine tools. A spindle bearing designed for high-speed applications typically has inner and outer rings, a bearing cage radially located between the inner and outer rings, and a plurality of bearings retained by the bearing ring. In a radially outwardly guided configuration, an outer circumferential surface of the bearing cage (the land guiding surface) is engaged with and guided by an inner circumferential surface of the outer ring (land surface). Oil from the bearing grease or similar lubricant forms a lubricant film between the land guiding surface and the land surface. In a radially inwardly guided configuration, an inner circumferential surface of the bearing cage (the land guiding surface) is engaged with and guided by an outer circumferential surface of the outer ring (land surface). Oil from the bearing grease or similar lubricant forms a lubricant film between the land guiding surface and the land surface. Lubrication of the land guiding surface is critical for operation of the bearing. However, at start up, the lubricant film is not yet fully formed between the land surface and the land guiding surface and base oil is only starting to migrate to the land guiding surface. Known spindle bearings do not provide a desired level of lubrication of the land guiding surface at start up.

SUMMARY

According to aspects illustrated herein, there is provided a bearing cage, including an outer circumferential surface, an inner circumferential surface, a radial surface aligned in a direction orthogonal to the axis of rotation, at least one chamber located in material forming the bearing cage, and one of at least one first channel connecting the at least one chamber to the radial surface and at least one second channel connecting the at least one chamber to one of the inner circumferential surface or the outer circumferential surface, or at least one first channel connecting the at least one chamber to the inner circumferential surface and at least one second channel connecting the at least one chamber to the outer circumferential surface.

According to aspects illustrated herein, there is provided a bearing assembly including: an inner ring including a first outer circumferential surface; an outer ring including a first inner circumferential surface; and a bearing cage including a second outer circumferential surface, a second inner circumferential surface, a radial surface aligned in a direction orthogonal to the axis of rotation, at least one chamber located in material forming the bearing cage, and one of at least one first channel connecting the at least one chamber to the radial surface and at least one second channel connecting the at least one chamber to one of the second inner circumferential surface or the second outer circumferential surface, or at least one first channel connecting the at least one chamber to the second inner circumferential surface and at least one second channel connecting the chamber to the second outer circumferential surface. The assembly includes a plurality of rolling elements retained by the bearing cage. The second outer circumferential surface is engaged with the first inner circumferential surface to guide the bearing cage, or the second inner circumferential surface is engaged with the first outer circumferential surface to guide the bearing cage.

According to aspects illustrated herein, there is provided a bearing cage, including an outer circumferential surface, an inner circumferential surface, a plurality of chambers located in material forming the bearing cage, and one of a plurality of channels connecting respective chambers from the plurality of chambers to the outer circumferential surface and a circumferentially disposed groove in the inner circumferential surface connected to the plurality of chambers, or a plurality of channels connecting respective chambers from the plurality of chambers to the inner circumferential surface and a circumferentially disposed groove in the outer circumferential surface connected to the plurality of chambers. The circumferentially disposed groove is arranged to receive a lubricant. The plurality of channels is arranged to dispense the lubricant to the inner or outer circumferential surface.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
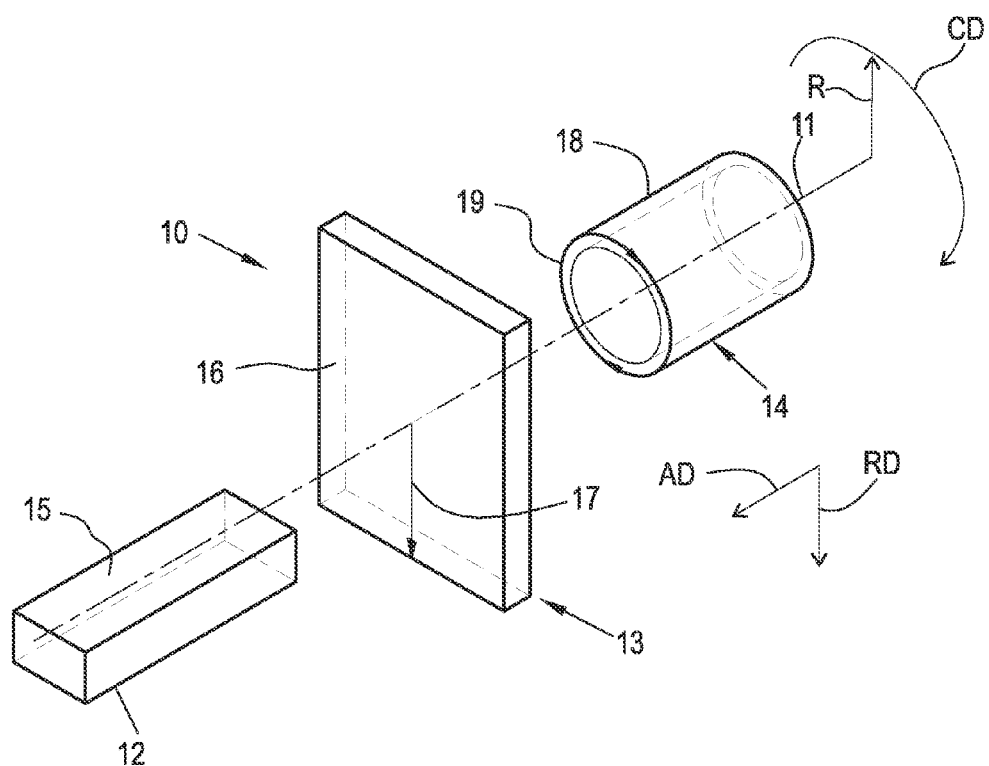
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
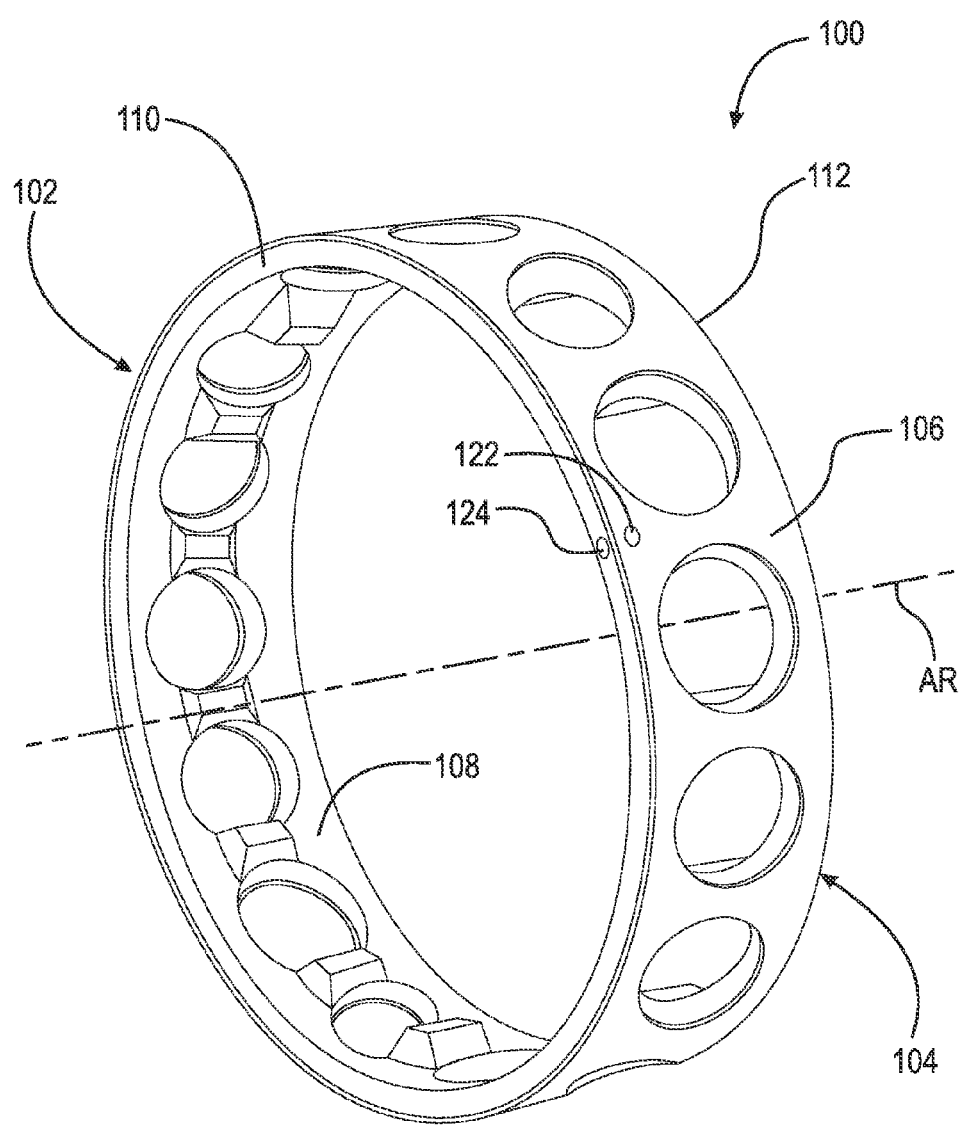
FIG. 2 is a perspective view of a bearing cage with a radially outwardly opening grease reservoir.

FIG. 2 is a perspective view of bearing cage 100 with a radially outwardly opening grease reservoir.

Figure 3:
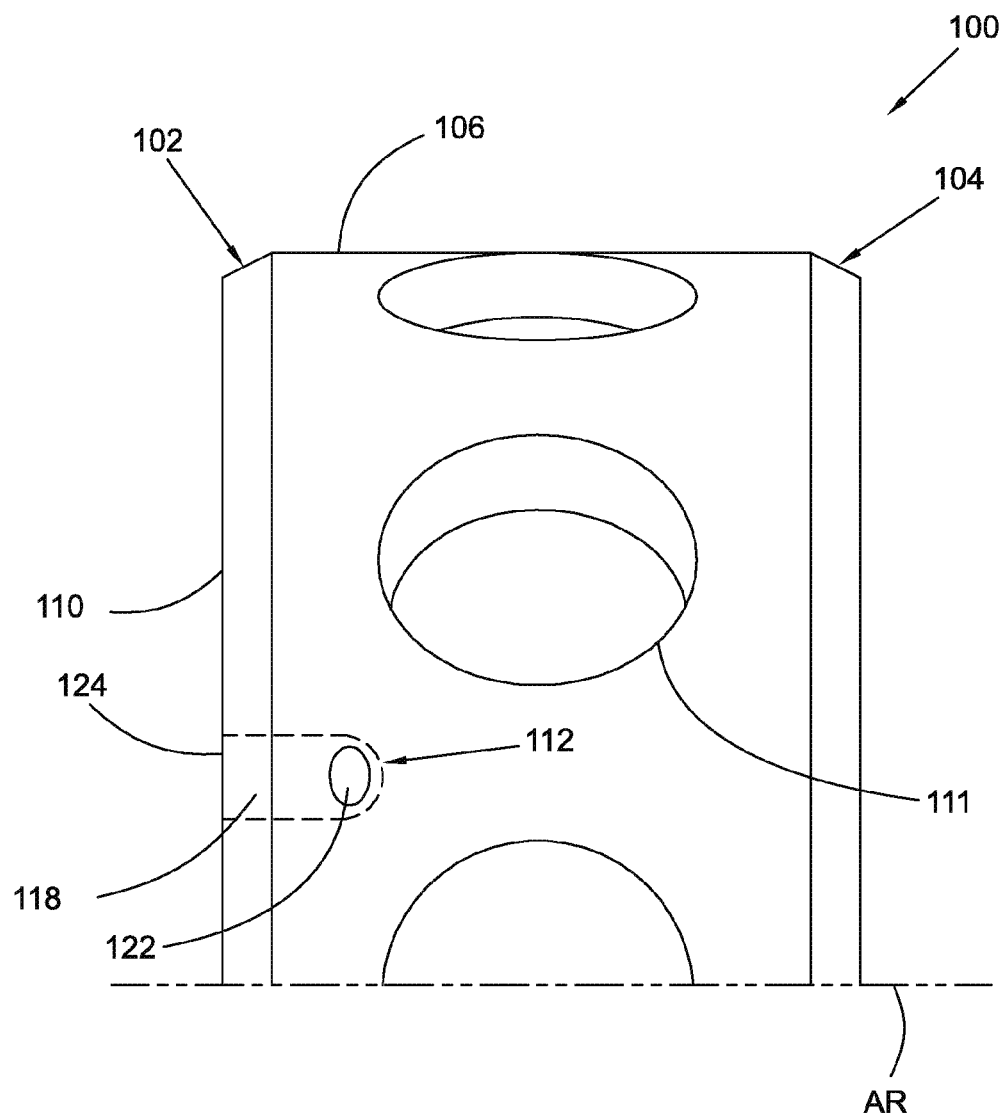
FIG. 3 is a partial side view of the bearing cage of FIG. 2.

FIG. 3 is a partial side view of bearing cage 100 of FIG. 2.

Figure 4:
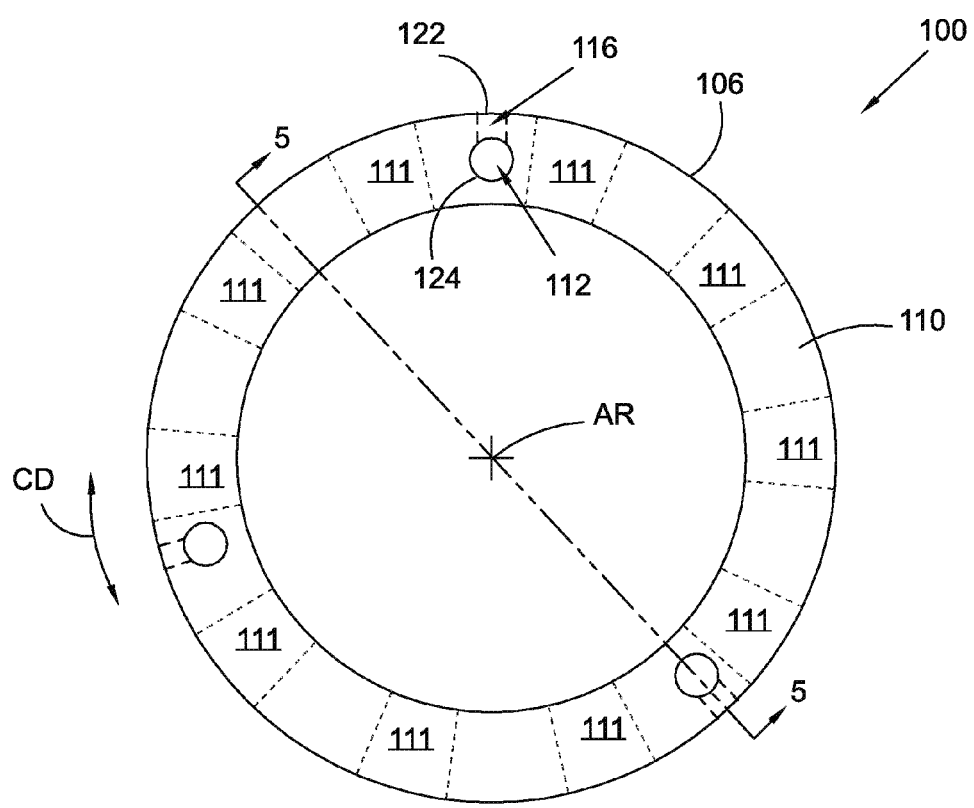
FIG. 4 is a schematic front view of the bearing cage of FIG. 2 with a plurality of grease reservoirs.

FIG. 4 is a schematic front view of bearing cage 100 of FIG. 2 with a plurality of grease reservoirs.

Figure 5:
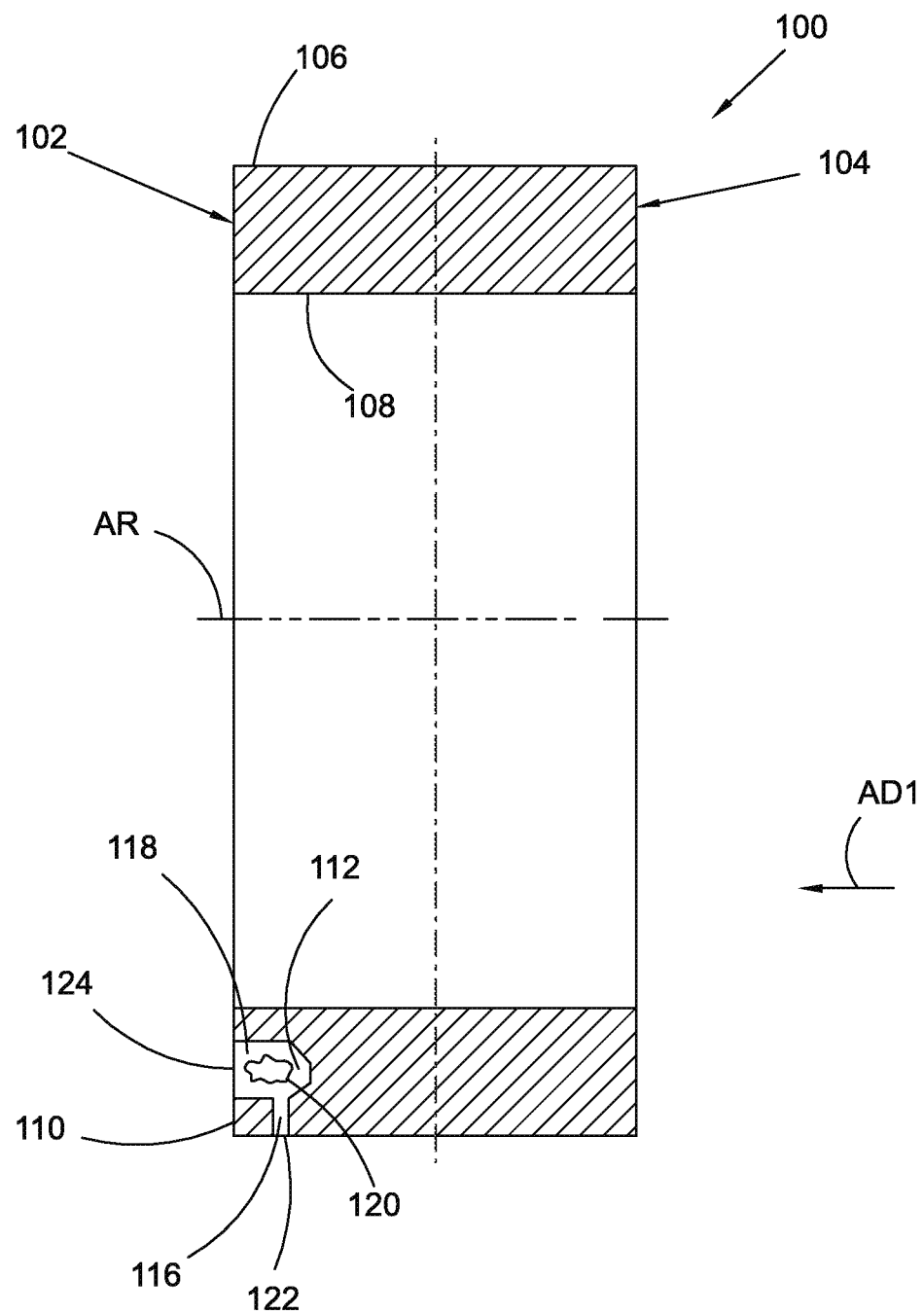
FIG. 5 is a cross-sectional view generally along line 5-5 in FIG. 4.

FIG. 5 is a cross-sectional view generally along line 5-5 in FIG. 4. The following should be viewed in light of FIGS. 2 through 5. Bearing cage 100 includes axis of rotation AR, axial end 102 and axial end 104. Cage 100 includes circumferential surfaces 106 and 108, radial surface 110 connecting surfaces 106 and 108, pockets 111, and at least one chamber 112 formed in cage 100, that is, formed in material forming cage 100. Surface 106 forms an outer circumferential land surface for bearing cage 100. Radial surface 110 faces substantially in axial direction AD1. By "faces substantially in axial direction AD1" we mean that surface 110 may have a slope in a radial direction but faces mostly in direction AD1.

Cage 100 includes at least one channel 116 and at least one channel 118. The discussion that follows is directed to a single chamber 112, a single channel 116, and a single channel 118; however, it should be understood that cage 100 can have respective pluralities of chambers 112, channels 116, and channels 118 and that the discussion is applicable to respective pluralities of chambers 112, channels 116, and channels 118. Channel 116 connects surface 106 and chamber 112. Channel 118 connects surface 110 and chamber 112.

Chamber 112 is arranged to receive lubricant 120 through channel 118 and to dispense the lubricant through channel 116. Any lubricant known in the art, for example, various types of grease, can be used for lubricant 120. In a typical installation, surface 106 is engaged with a land for an outer ring (not shown) and channel 116 dispenses the lubricant between surface 106 and the land to advantageously reduce friction between the land surface and the land.

Channel 116 includes opening 122 and channel 118 includes opening 124. In an example embodiment, an area for opening 124 is greater than an area for opening 122. In an example embodiment, chambers 112 are at least partly aligned in circumferential direction CD. In an example embodiment, channels 116 are at least partly aligned in circumferential direction CD. In an example embodiment, channels 118 are at least partly aligned in circumferential direction CD.

Cage 100 is shown with a particular number and configuration of chambers 112, channels 116, and channels 118. However, it should be understood that cage 100 is not limited to a particular number or configuration of chambers 112, channels 116, and channels 118.

Chamber 112, channel 116, and channel 118 are shown proximate end 102; however, it should be understood that chamber 112, channel 116, and channel 118 can be proximate end 104 instead of end 102. It also should be understood that respective chambers 112, respective channels 116, and respective channels 118 can be included proximate end 102 and end 104.

Figure 6:
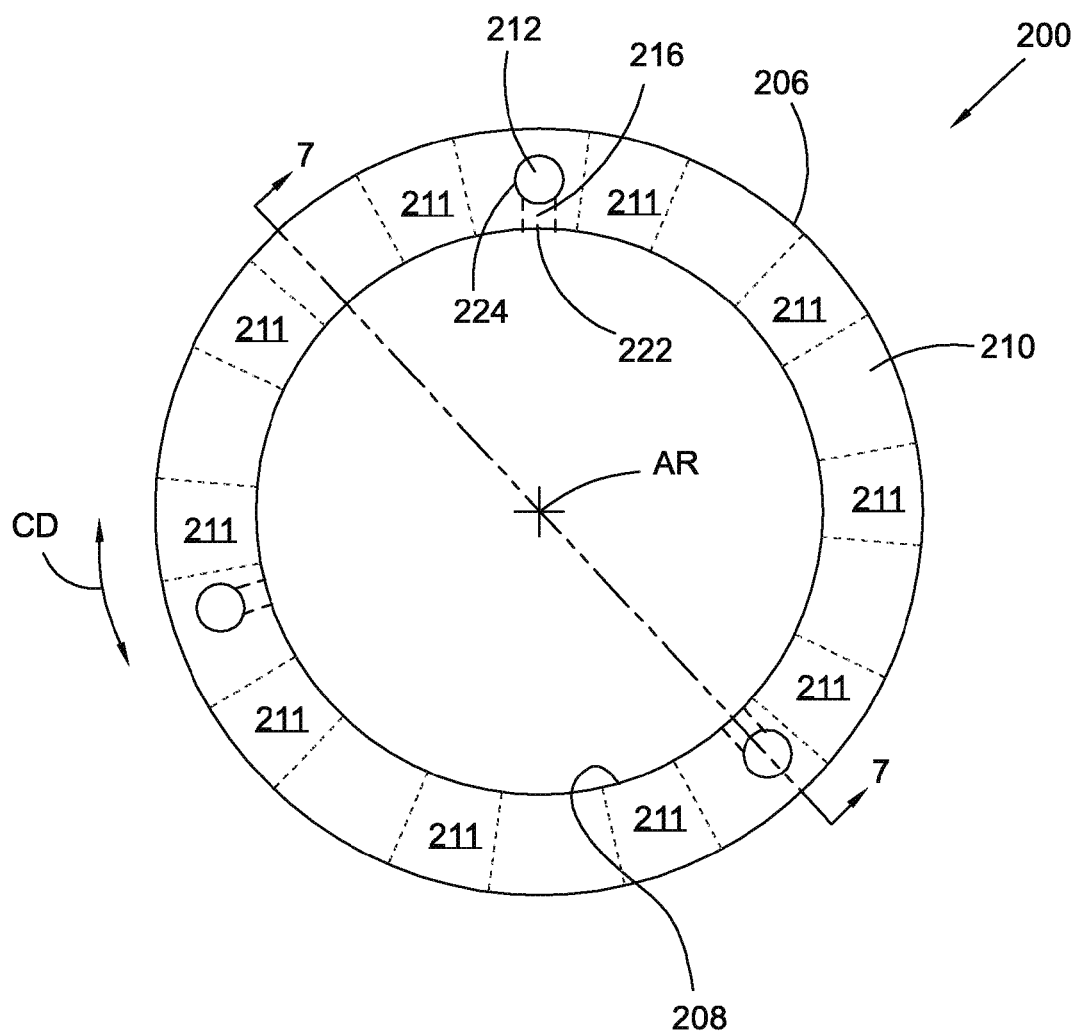
FIG. 6 is a schematic front view of a bearing cage with a plurality of radially inwardly opening grease reservoirs.

FIG. 6 is a schematic front view of bearing cage 200 with a plurality of radially inwardly opening grease reservoirs.

Figure 7:
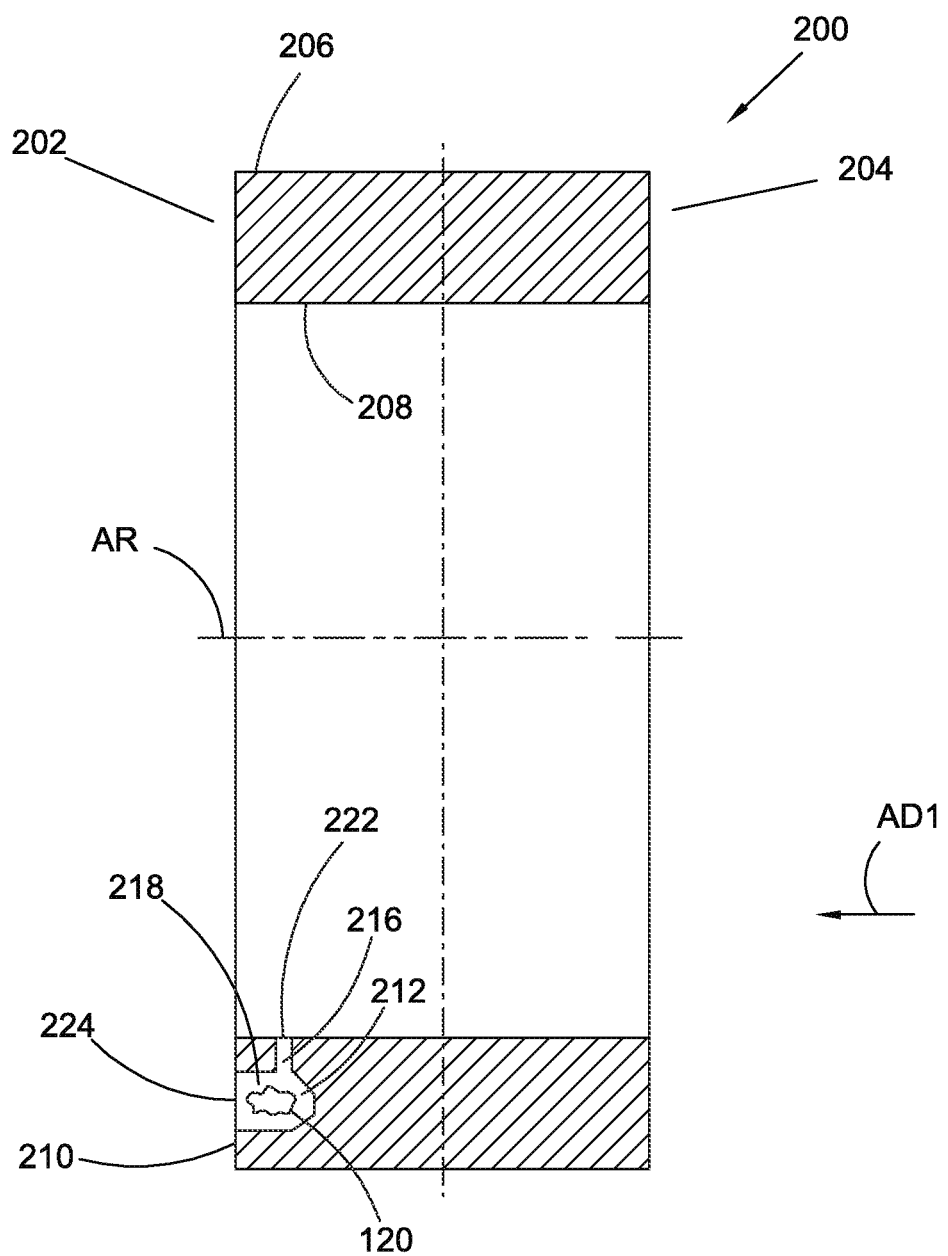
FIG. 7 is a cross-sectional view generally along line 7-7 in FIG. 6.

FIG. 7 is a cross-sectional view generally along line 7-7 in FIG. 6. The following should be viewed in light of FIGS. 6 and 7. Bearing cage 200 includes axis of rotation AR, axial end 202 and axial end 204. Cage 200 includes circumferential surfaces 206 and 208, radial surface 210 connecting surfaces 206 and 208, pockets 211, and at least one chamber 212 formed in cage 200, that is, formed in material forming cage 200. Surface 208 forms a portion of an inner circumferential land surface for bearing cage 200. Radial surface 210 faces substantially in axial direction AD1.

Cage 200 includes at least one channel 216 and at least one channel 218. The discussion that follows is directed to a single chamber 212, a single channel 216, and a single channel 218; however, it should be understood that cage 200 can have respective pluralities of chambers 212, channels 216, and channels 218 and that the discussion is applicable to respective pluralities of chambers 212, channels 216, and channels 218. Channel 216 connects surface 208 and chamber 212. Channel 218 connects surface 210 and chamber 212. Chamber 212 is arranged to receive lubricant 120 through channel 218 and to dispense the lubricant through channel 216. In a typical installation, surface 208 is engaged with a land for an inner ring (not shown) and channel 216 dispenses the lubricant between surface 208 and the land to advantageously reduce friction between the land surface and the land.

Channel 216 includes opening 222 and channel 218 includes opening 224. In an example embodiment, an area for opening 224 is greater than an area for opening 222. In an example embodiment, chambers 212 are at least partly aligned in circumferential direction CD. In an example embodiment, channels 216 are at least partly aligned in circumferential direction CD. In an example embodiment, channels 218 are at least partly aligned in circumferential direction CD.

Cage 200 is shown with a particular number and configuration of chambers 212, channels 216, and channels 218.

However, it should be understood that cage 200 is not limited to a particular number or configuration of chambers 212, channels 216, and channels 218.

Chamber 212, channel 216, and channel 218 are shown proximate end 202; however, it should be understood that chamber 212, channel 216, and channel 218 can be proximate end 204 instead of end 202. It also should be understood that respective chambers 212, respective channels 216, and respective channels 218 can be proximate both end 202 and end 204.

Figure 8:
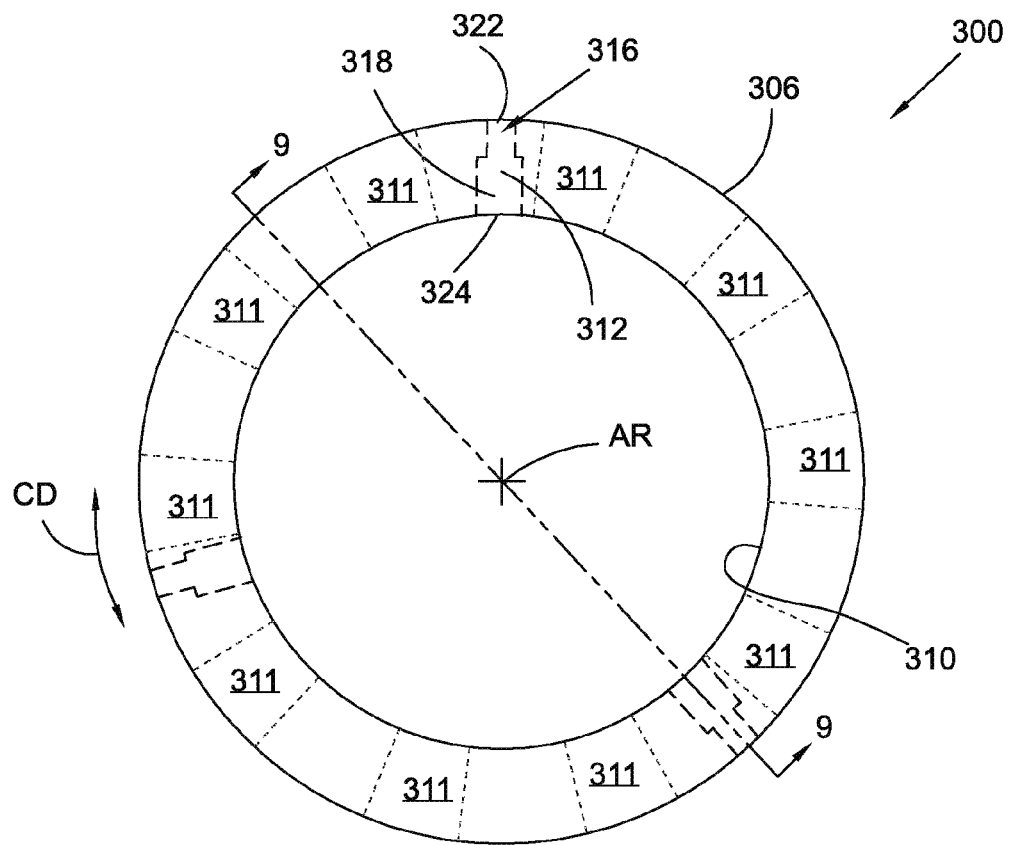
FIG. 8 is a schematic front view of a bearing cage with a plurality of radially outwardly opening grease reservoirs.

FIG. 8 is a schematic front view of bearing cage 300 with a plurality of radially outwardly opening grease reservoirs.

Figure 9:
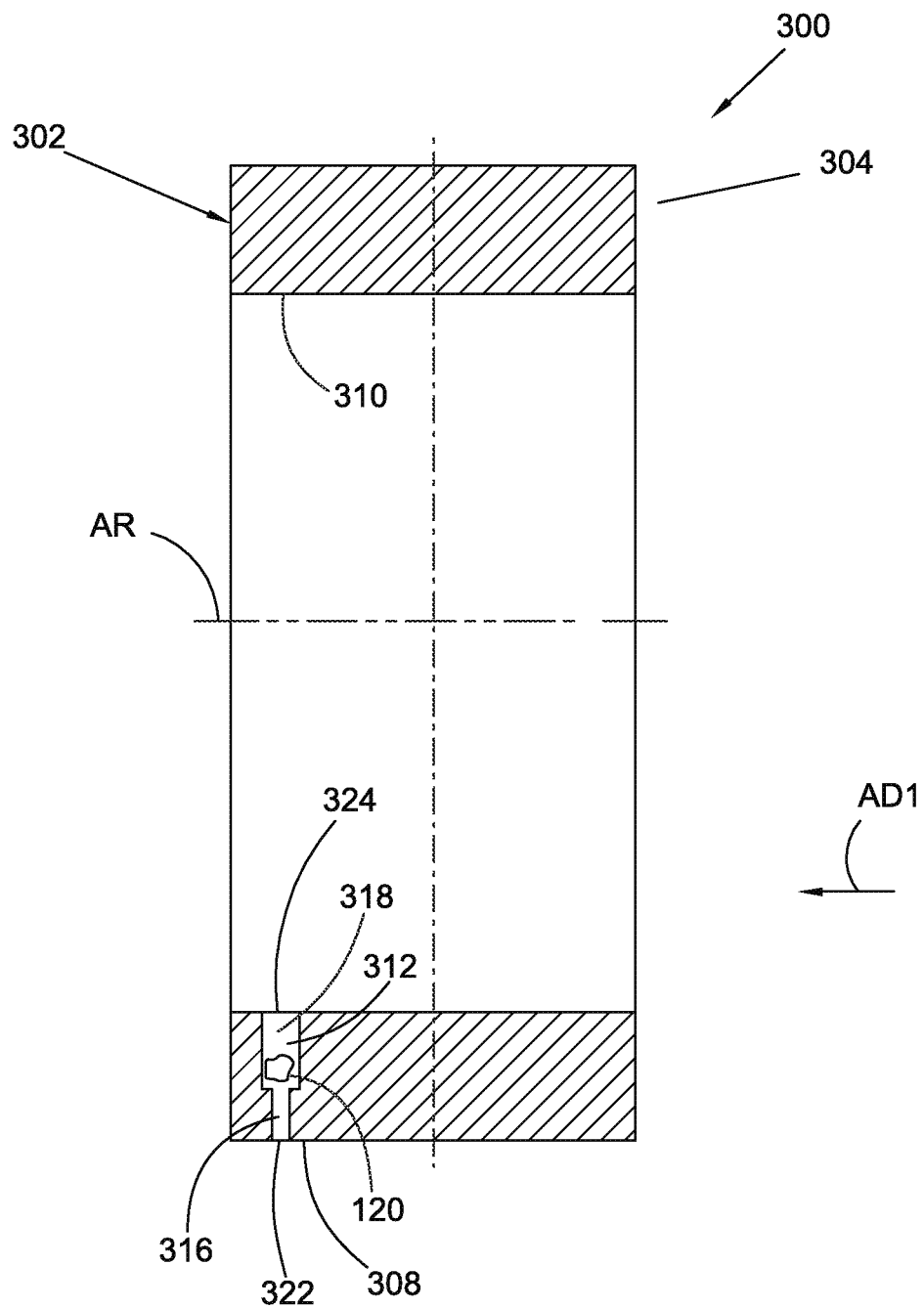
FIG. 9 is a cross-sectional view generally along line 9-9 in FIG. 8.

FIG. 9 is a cross-sectional view generally along line 9-9 in FIG. 8. The following should be viewed in light of FIGS. 8 and 9. Bearing cage 300 includes axis of rotation AR, axial end 302 and axial end 304. Cage 300 includes circumferential surface 308, circumferential surface 310, pockets 311, and at least one chamber 312 formed in cage 300, that is, formed in material forming cage 300. Surface 308 forms a portion of an outer circumferential land surface for bearing cage 300.

Cage 300 includes at least one channel 316 and at least one channel 318. The discussion that follows is directed to a single chamber 312, a single channel 316, and a single channel 318; however, it should be understood that cage 300 can have respective pluralities of chambers 312, channels 316, and channels 318 and that the discussion is applicable to respective pluralities of chambers 312, channels 316, and channels 318. Channel 316 connects surface 308 and chamber 312. Channel 318 connects surface 310 and chamber 312. Chamber 312 is arranged to receive lubricant 120 through channel 318 and to dispense the lubricant through channel 316. In a typical installation, surface 306 is engaged with a land for an outer ring (not shown) and channel 316 dispenses the lubricant between surface 306 and the land to advantageously reduce friction between the land surface and the land.

Channel 316 includes opening 322 and channel 318 includes opening 324. In an example embodiment, the area for opening 324 is greater than the area for opening 322. In an example embodiment, chambers 312 are at least partly aligned in circumferential direction CD. In an example embodiment, channels 316 are at least partly aligned in circumferential direction CD. In an example embodiment, channels 318 are at least partly aligned in circumferential direction CD.

Cage 300 is shown with a particular number and configuration of chambers 312, channels 316, and channels 318. However, it should be understood that cage 300 is not limited to a particular number or configuration of chambers 312, channels 316, and channels 318.

Chamber 312, channel 316, and channel 318 are shown in proximate end 302; however, it should be understood that chamber 312, channel 316, and channel 318 can be proximate end 304 instead of end 302. It also should be understood that respective chambers 312, respective channels 316, and respective channels 318 can be proximate end 302 and end 304.

Figure 10:
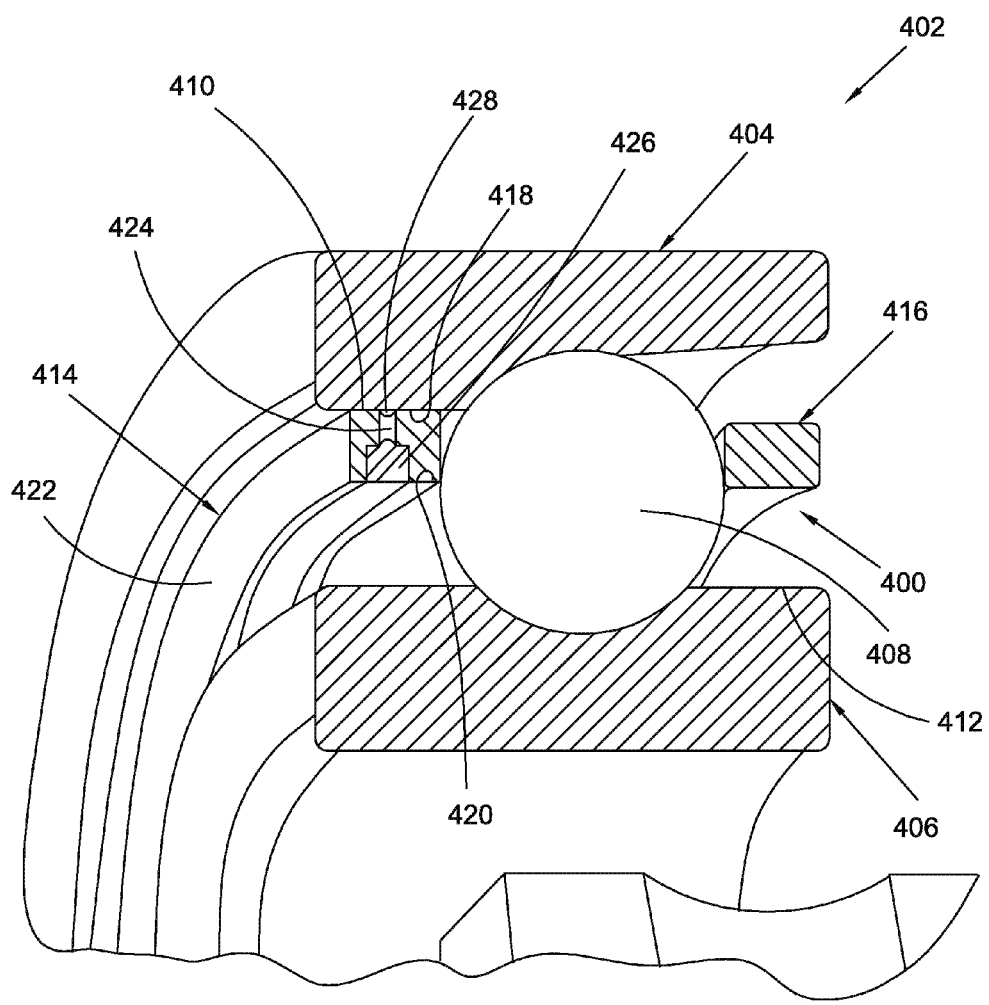
FIG. 10 is a partial cut-away view of a bearing assembly including a bearing cage with a radially outwardly opening grease reservoir.

FIG. 10 is a partial cut-away view of a bearing assembly including bearing cage 400 with a radially outwardly opening grease reservoir.

Figure 11:
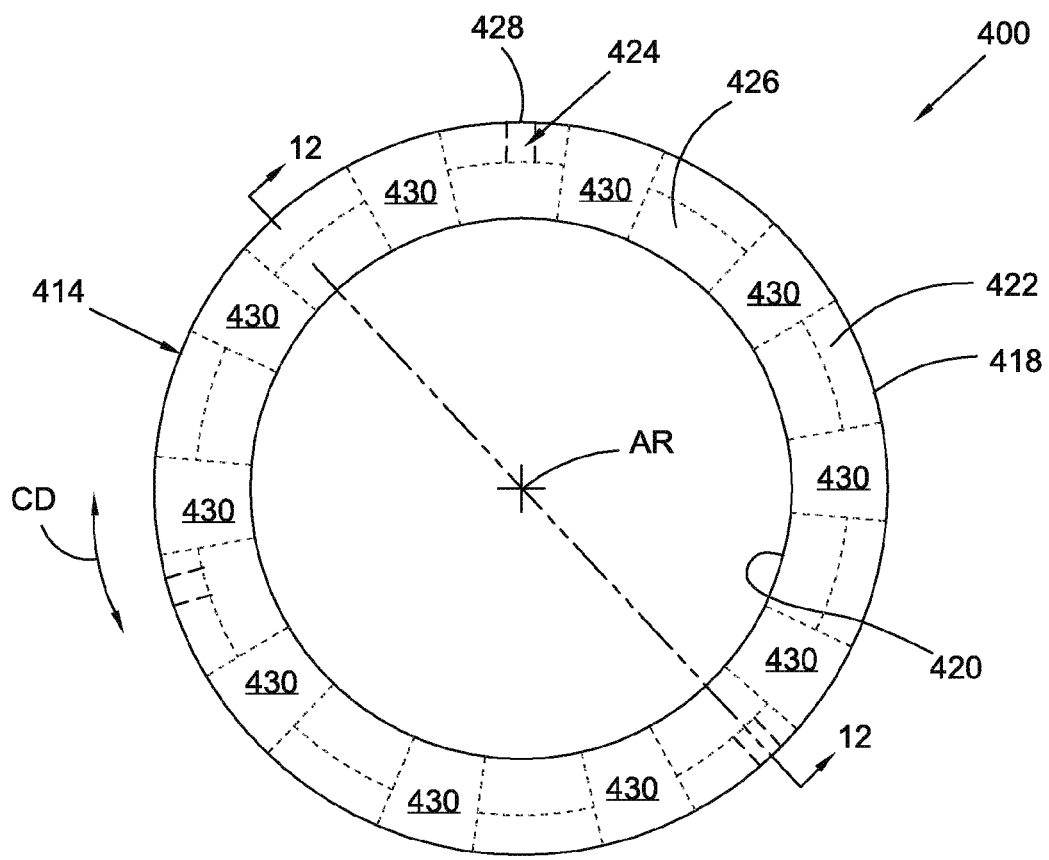
FIG. 11 is a schematic front view of the bearing cage in FIG. 10.

FIG. 11 is a schematic front view of bearing cage 400 in FIG. 10.

Figure 12:
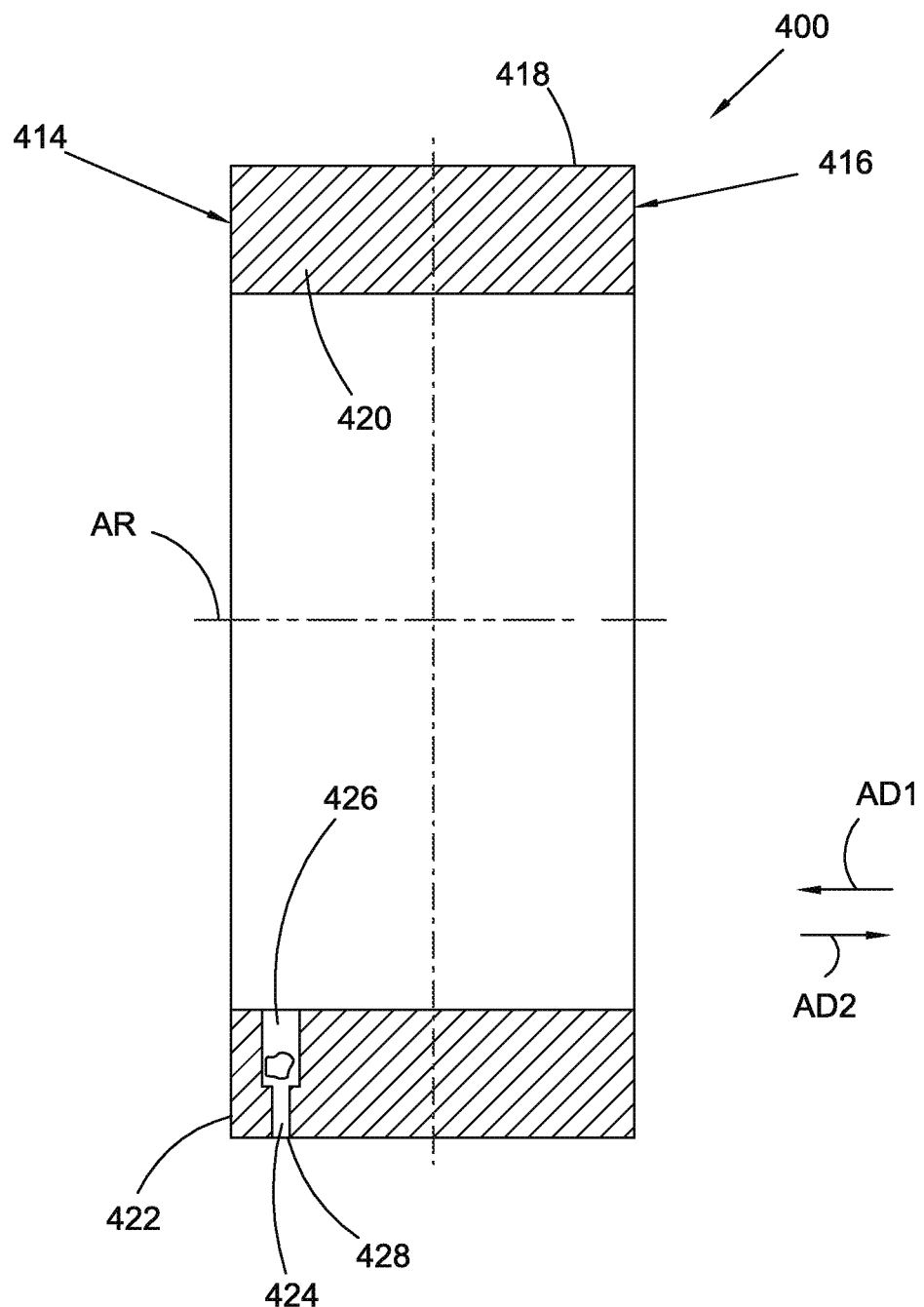
FIG. 12 is a cross-sectional view generally along line 12-12 in FIG. 11.

FIG. 12 is a cross-sectional view generally along line 12-12 in FIG. 11. The following should be viewed in light of FIGS. 10 through 12. Assembly 402 includes axis of rotation AR, bearing cage 400, outer ring 404, inner ring 406, and at least one rolling element 408. Ring 404 includes inner circumferential surface 410, also referred to as land surface 410. Ring 406 includes outer circumferential surface 412, referred to as land surface 412. Cage 400 includes side axial ends 414 and 416. Cage 400 includes outer circumferential surface 418, inner circumferential surface 420, radial surface 422, at least one channel 424, and at least one groove 426 in surface 420, disposed in circumferential direction CD, connected to channel(s) 424, and forming a chamber in the material forming cage 400. Each channel 424 includes a respective opening 428 in surface 418. Bearing cage 400 includes pockets 430.

Each groove 426 is arranged to receive lubricant and each channel 424 is arranged to dispense the lubricant to surfaces 410 and 418 to advantageously reduce friction between cage 400 and land surface 410.

Cage 400 is shown with a particular configuration of groove 426 and channels 424 and a particular number of channels 424. However, it should be understood that cage 400 is not limited to a particular number or configuration of grooves 426 and channels 424. For example, rather than continuous grooves 426 connecting respective pairs of channels 424, cage 400 can include multiple grooves, discontinuous in circumferential direction CD, connecting respective pairs of channels 424.

In an example embodiment (not shown), surface 420 is in contact with land surface 412, at least one groove 426 is formed in surface 418, and at least one channel 424 connects the at least on groove 426 to surface 420.

Grooves 426 and channels 424 are shown proximate end 414; however, it should be understood that grooves 426 and channels 424 can be proximate 416 instead of end 414. It also should be understood respective sets of grooves 426 and channels 424 can be proximate end 414 and end 416. In an example embodiment, channels 424 are at least partly aligned in circumferential direction CD.

It should be understood that bearing cages 100, 200, and 300 can replace cage 400 in assembly 402.

It should be understood that the different configurations shown for cages 100, 200, 300, and 400 can be used in a single bearing cage. For example, the configuration of chambers and channels shown for cage 100 can be used in one side rim of a bearing cage and the configuration of chambers and channels shown in cage 200 or 300 can be used in the other side rim of the bearing cage. It should be understood that cages 100, 200, 300, and 400 are not limited to the number, size, or configuration of pockets 111, 211, 311, and 430, respectively.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A bearing cage, comprising:
   an outer circumferential surface;
   an inner circumferential surface;
   a radial surface connecting the inner and outer circumferential surfaces;
   at least one chamber located in material forming the bearing cage; and,
   at least one first channel connecting the at least one chamber to the inner circumferential surface and at least one second channel connecting the at least one chamber to the outer circumferential surface, wherein:
   the at least one first channel includes at least one opening in the inner circumferential surface having a first area and, the at least one second channel includes at least one opening in the outer circumferential surface having a second area less than the first area.

2. The bearing cage of claim 1, wherein:
the at least one first channel is arranged to receive a lubricant; and,
the at least one second channel is arranged to dispense the lubricant to the inner or outer circumferential surface.

3. The bearing cage of claim 1, wherein:
the at least one second channel is arranged to receive a lubricant; and,
the at least one first channel is arranged to dispense the lubricant to the inner circumferential surface.

4. The bearing cage of claim 1, wherein:
the at least one chamber includes a plurality of chambers at least partly aligned in a circumferential direction; and,
the at least one first channel includes a plurality of first channels at least partly aligned in the circumferential direction.

5. The bearing cage of claim 1, wherein:
the at least one chamber includes a plurality of chambers; and,
the at least one first channel includes a circumferentially disposed groove connected to the plurality of chambers.

6. The bearing cage of claim 1, wherein:
the at least one chamber is wholly enclosed by the material forming the bearing cage except for the at least one first and second channels.

7. The bearing cage of claim 1, wherein:
the bearing cage includes the first channel connecting the at least one chamber to the radial surface and the second channel connecting the at least one chamber to the inner circumferential surface.

8. The bearing cage of claim 1, wherein:
the bearing cage includes the first channel connecting the at least one chamber to the radial surface and the second channel connecting the at least one chamber to the outer circumferential surface.

9. A bearing assembly comprising:
an inner ring including a first outer circumferential surface;
an outer ring including a first inner circumferential surface;
a bearing cage including:
  a second outer circumferential surface;
  a second inner circumferential surface;
  a radial surface connecting the second inner and outer circumferential surfaces;
  at least one chamber located in material forming the bearing cage; and,
  at least one first channel connecting the at least one chamber to the second inner circumferential surface and at least one second channel connecting the at least one chamber to the second outer circumferential surface; and,
a plurality of rolling elements retained by the bearing cage, wherein the bearing cage is free of an opening:
  connecting the at least one chamber to the radial surface; or,
  connecting the at least one first channel to the radial surface; or,
  connecting the at least one second channel to the radial surface; and,
wherein:
  the second outer circumferential surface is engaged with the first inner circumferential surface to guide the bearing cage; or,
  the second inner circumferential surface is engaged with the first outer circumferential surface to guide the bearing cage.

10. The bearing assembly of claim 9, wherein:
the at least one first channel is arranged to receive a lubricant; and,
the at least one second channel is arranged to dispense the lubricant.

11. The bearing assembly of claim 9, wherein:
the at least one second channel is arranged to receive a lubricant; and,
the at least one first channel is arranged to dispense the lubricant.

12. The bearing cage of claim 9, wherein:
the at least one chamber includes a plurality of chambers at least partly aligned in a circumferential direction; and,
the at least one first channel includes a plurality of first channels at least partly aligned in the circumferential direction.

13. The bearing cage of claim 9, wherein:
the at least one chamber includes a plurality of chambers; and,
the at least one first channel includes a circumferentially disposed groove connected to the plurality of chambers.

14. The bearing assembly of claim 9, wherein:
the at least one chamber is wholly enclosed by the material forming the bearing cage except for the first and second channels.

15. A bearing cage, comprising:
an outer circumferential surface;
an inner circumferential surface;
a plurality of chambers located in material forming the bearing cage;
a plurality of channels connecting respective chambers from the plurality of chambers to the outer circumferential surface; and,
a circumferentially disposed groove in the inner circumferential surface connected to the plurality of chambers, wherein:
  the circumferentially disposed groove is arranged to receive a lubricant; and,
  the plurality of channels is arranged to dispense the lubricant to the inner or outer circumferential surface.

16. The bearing cage of claim 15, wherein:
each chamber in the plurality of chambers is wholly enclosed by the material forming the bearing cage except for the circumferentially disposed groove and the plurality of channels.

* * * * *